Jan. 15, 1935.  A. A. VARESE  1,988,404
COMBINED CAP AND PRESSURE APPLYING ATTACHMENT
Filed Nov. 3, 1933
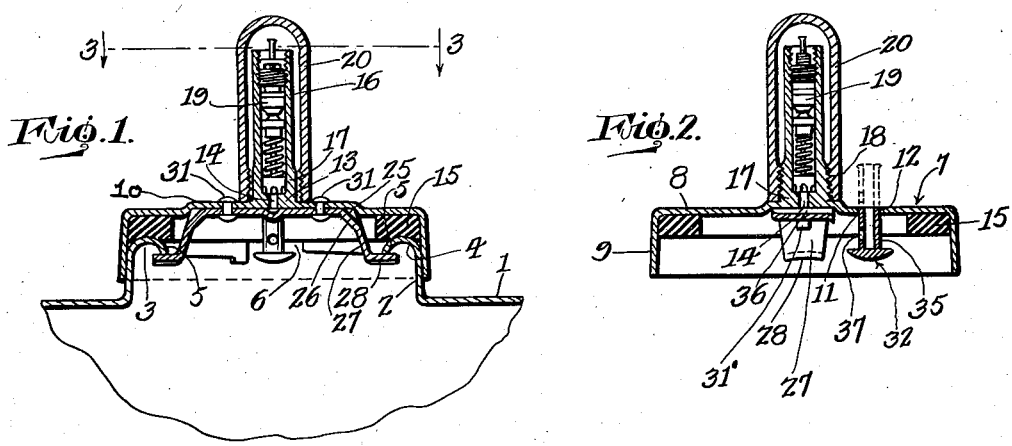
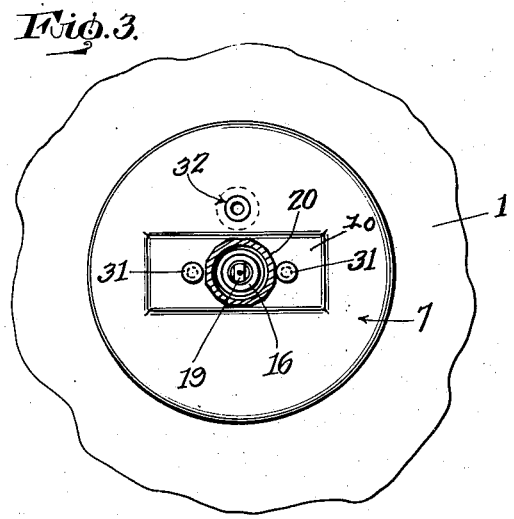
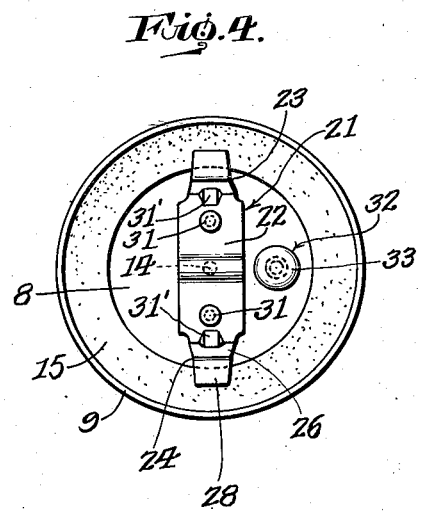
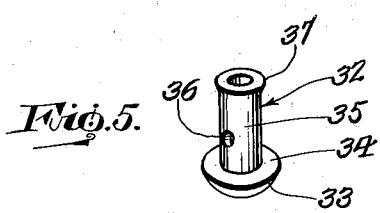
Inventor
Anthony A. Varese
By Geo. P. Kimmel
Attorney Patented Jan. 15, 1935

1,988,404

UNITED STATES PATENT OFFICE 1,988,404

COMBINED CAP AND PRESSURE APPLYING ATTACHMENT

Anthony A. Varese, Chicago, Ill.

Application November 3, 1933, Serial No. 696,573

8 Claims. (Cl. 220—24)

This invention relates to a combined cap and pressure applying attachment for the fuel tanks of automotive vehicles, and has for its object to provide, in a manner as hereinafter set forth, an attachment of the class referred to for applying fluid pressure to the fuel tank for the purpose of cleaning the fuel feed line; for refilling vacuum tanks when dry; for forcing fuel to a carburetor when necessary; and for cleaning out a carburetor.

A further object of the invention is to provide, in a manner as hereinafter set forth, an attachment of the class referred to for applying fluid pressure to a fuel tank for the purpose of cleaning out foreign matter clogging up a fuel feed line without the necessity of disassembling the latter.

A further object of the invention is to provide, in a manner as hereinafter set forth, a combined cap and pressure applying attachment capable of functioning as the cap for a fuel tank and including a shiftable normally open vent or relief element for the introduction of atmospheric pressure to the tank, and with the vent or relief element capable of being shifted automatically to closed position by and on the application to the tank of fluid pressure to prevent the exhausting of the latter.

A further object of the invention is to provide, in a manner as hereinafter set forth, a combined cap and pressure applying attachment for fuel tanks of automobiles for applying fluid pressure to the tank to force the fuel from the latter to the carburetor of the engine when going up steep grades and when the fuel will not flow through the medium of gravity or the like.

Further objects of the invention are to provide, in a manner as hereinafter set forth, an attachment of the class referred to which is simple in its construction and arrangement, strong, durable, compact, readily connected to the fuel tank, thoroughly efficient in its use, conveniently attached to a source of fluid pressure, and inexpensive to manufacture.

To the above ends essentially and to others which may hereinafter appear, the invention consists of such parts, and such combination of parts which fall within the scope of the invention as claimed.

In the drawing:

Figure 1 is a vertical sectional view of the attachment as applied to and forming a closure cap for the filling neck of a fuel tank.

Figure 2 is a vertical sectional view of the attachment taken at right angles to Figure 1 and showing the vent or relief element in open position in full lines and in closed position in dotted lines.

Figure 3 is a section on line 3—3 Figure 1.

Figure 4 is an inverted view of the attachment.

Figure 5 is a perspective view of the vent element.

The attachment is illustrated by way of example as providing a closure cap for a fuel tank 1. It is to be understood, however, that the attachment may or may not be a permanent closure cap for the tank, as it may be stored in the vehicle, and when occasion requires substituted for the desired period for the tank closure. The tank 1 includes a filling neck 2 formed at its top with a pair of oppositely disposed spaced inwardly extending flanges 3, 4 of curved cross section having downturned inner parts 5. The flanges constitute keepers for a latching member to be hereinafter referred to. The spaces between the flanges are indicated at 6 and form clearances to permit of positioning the latching member to coact with the flanges to couple the attachment to the neck 2.

The attachment includes an annular cap member 7 formed of a top 8 and a rim 9 depending from the latter. The top 7 centrally thereof is formed with an upset portion 10 of rectangular contour and adjacent said portion with an opening 11. The upper end of the wall of opening 11 is countersunk as at 12. The portion 10 centrally of its upper face and at the axis of top 8 is formed with an enlargement 13 provided with an axial opening 14 for the passage of fluid pressure to the tank 1 when the attachment is coupled to the neck 2 and a source of fluid pressure. The inner diameter of the rim 9 with respect to the outer diameter of the neck 2 is such that the inner face of the rim will snugly engage the outer face of the neck. Arranged within member 7 and abutting the inner face of top 8 and rim 9 is a compressible sealing element 15 in the form of an annulus. When the attachment is coupled to neck 2 the sealing element 15 bears against the high parts of the flanges 3, 4 and is compressed thereby to provide a sealed airtight joint between the attachment and the neck. When the attachment is removed from the tank, the sealing element will be retained in the cap member by the latching member to be referred to.

Formed integral with the enlargement 13 is the lower end of a tubular stem 16 having an enlarged lower portion 17 which is peripherally threaded, as at 18. Arranged within the stem 16 is a normally closed spring controlled valve assembly 19 of a form similar to that of the well known inflating valve employed in connection with pneumatic tires. Threadedly engaging with the threaded lower portion 17 of the stem 16 is a protecting member 20 for the stem. The member 20 completely encloses the stem and is removably connected to the latter.

The latching member is generally indicated at 21 and formed from a strap of metallic material. The member 21 consists of an inverted yoke-shaped part having its top indicated at 22 and its arms at 23, 24. The arms are oppositely disposed and extend at opposite inclinations with respect to each other. The top 22 is seated in the recess 25 formed by the upset portion 10. Each of the arms is of like form and consists of an upper outwardly inclined part 26 which extends from an end of top 22, a lower outwardly inclined part 27 extending from the lower end of and having the inclination thereof less than that of part 26 and an outwardly disposed retaining part 28 extending from the lower end of and at right angles to the part 27. The parts 28 coact with the edges 29 of the flanges 3, 4 for latching the attachment to and in closure position with respect to the neck 2 of the tank. The clearances 6 permit of the latching member 21 entering neck 2, after which the attachment is given a quarter turn to bring the parts 28 to engage the edges of the flanges. The arms 23, 24 are resilient and of less width than that of the top 22. At the transverse median of top 22 it is formed with a groove 20 constituting a channel positioned directly below the opening 14 for conducting fluid pressure into the tank. The groove is open at each end and inclines downwardly from one end to the other end thereof. The latching member 21 is anchored to the upset portion 10 of top 8 by riveting it thereto, as at 31. Centrally of the points of joinder of top 22 with the arms 23, 24 the member 21 is depressed as at 31' for reinforcing purposes.

The cap member 7 is provided with a vent or relief element 32, which functions to admit air to the tank to relieve the vacuum created in the tank by the feeding of the fuel therefrom, and also acts as a closure to prevent discharge of fluid pressure from the tank when the attachment is in fluid pressure applying position with respect to the tank. The element 32 furthermore acts to provide for the exhaust of fluid pressure within the tank at the end of the fluid pressure applying operation.

The element 32 consists of a solid valve head 33 of segmental cross section and having a flat upper face 34. Integral at its lower end with and arranged concentrically with respect to the upper face 34 of head 33 is a relief member in the form of a tube 35 provided intermediate its ends with a port 36 and at its upper end with an annular lateral flange 37. The tube 35 is closed at its lower end and open at its upper end. The element 32 is slidably mounted in the opening 11 and when in normal position is suspended from the top 8 of cap member 7 by the coaction of the flange 37 with the countersunk portion 12 of the wall of opening 10. The normal position of element 32 is as illustrated in full lines, Figure 2, and permits of the entrance of air to and the discharge of fluid pressure from the tank through the port 36. When fluid pressure is supplied to the tank the element 32 is automatically shifted upwardly to the position shown in dotted lines, Figure 2, whereby port 36 will be arranged above the top 8 of cap member 7 thereby preventing discharge of fluid pressure from and the entrance of air to the tank.

When the attachment is used for applying fluid pressure to the tank for any of the purposes referred to, the stem 16 is connected for the necessary period to a source of fluid pressure and in a manner to open the spring controlled valve assembly 19.

The channel provided by the groove 30 in the latching member 21 will cause the fluid pressure when supplied through opening 14, the inlet, to travel in a lateral direction with respect to the member 21 whereby it will be applied upon the fuel at spaced points adjacent the axis of the cap member instead of but a single point aligning with such axis. This manner of applying the fluid pressure facilitates the forcing of the fuel for any one of the purposes referred to. The arrangement of opening 14, the inlet, with respect to member 21 reduces the clogging up of such opening from foreign matter within the tank. The member 21 also reduces to a minimum the entrance of the fuel into stem 16 when the fuel splashes within the tank. Owing to the arrangement of the fluid pressure conducting channel with respect to the opening 14 the fluid pressure will be supplied to within the cap member diametrically thereof.

What I claim is:—

1. In a combined closure cap and fluid pressure applying attachment for fuel tanks of automotive vehicles, a cap member having an axial opening providing an inlet for fluid pressure to the tank, a normally closed fluid pressure supply controlling valve structure integral with the cap member and communicating with said opening, and a latching member within the cap member for latching the latter to the tank to close the fuel filling opening for the latter, said latching member having a part thereof anchored directly against the inner face of the cap member, said part being formed transversely of that face thereof opposing the inner face of the cap with a fluid pressure conducting channel opening at each side of said part into the cap member and positioned directly below and into which said inlet opens, and an automatically shiftable combined relief and closure element slidably connected to and depending from said cap member.

2. In a combined closure cap and fluid pressure applying attachment for fuel tanks of automotive vehicles, a cap member having an axial opening providing an inlet for fluid pressure to the tank, a normally closed fluid pressure supply controlling valve structure integral with the cap member and communicating with said opening, a latching member within the cap member for latching the latter to the tank to close the fuel filling opening for the latter, said latching member being formed with a fluid pressure conducting channel opening into the cap member and positioned directly below and into which said inlet opens, and a vertically movable automatically shiftable relief element carried by the cap member for depending into the tank and provided with means having provisions for admitting air to the tank and to prevent the discharge of and to provide for the relief of fluid pressure from the tank.

3. In a combined closure cap and fluid pressure applying attachment for fuel tanks of automotive vehicles, a cap member having an axial opening providing an inlet for fluid pressure to the tank, a normally closed fluid pressure supply controlling valve structure integral with the cap member and communicating with said opening, a latching member within the cap member for latching the latter to the tank to close the fuel filling opening for the latter, said latching member having a stretch thereof secured against the inner face of said cap member, said stretch being formed with a fluid pressure conducting channel opening into the cap member and positioned directly below and into which said inlet opens, and the said channel being disposed at the transverse median of said stretch and extending from one side edge to the other side edge of the latter, and an automatically shiftable combined relief and closure element slidably connected to and depending from said cap member.

4. In a combined closure cap and fluid pressure applying attachment for fuel tanks of automotive vehicles, a cap member having an axial opening providing an inlet for fluid pressure to the tank, a normally closed fluid pressure supply controlling valve structure integral with the cap member and communicating with said opening, a latching member within the cap member for latching the latter to the tank to close the fuel filling opening for the latter, said latching member having a stretch thereof secured against the inner face of said cap member, said stretch being formed with a fluid pressure conducting channel opening into the cap member and positioned directly below and into which said inlet opens, and said channel being disposed at the transverse median of said stretch, extending from one side edge to the other side edge of the latter and inclining downwardly from one end thereof to the other, and an automatically shiftable combined relief and closure element slidably connected to and depending from said cap member.

5. In a combined closure cap and fluid pressure applying attachment for fuel tanks of automotive vehicles, a cap member formed with an opening providing an inlet for fluid pressure to the interior thereof, a normally closed fluid pressure supply controlling valve structure for connection to a source of fluid pressure, said structure being anchored to the outer face of the cap member and discharging into said inlet, and a cap member latching element secured intermediate its ends to the inner face of the cap member and provided with means to form a fluid pressure conducting channel for discharging the fluid pressure in opposite directions from the sides of said element diametrically of the cap member and into the latter, said inlet opening directly into said channel intermediate the ends of the latter, and an automatically shiftable combined relief and closure element slidably connected to and depending from said cap member.

6. In a combined closure cap and fluid pressure applying attachment for fuel tanks of automotive vehicles, a cap member formed with an opening providing an inlet for fluid pressure to the interior thereof, a normally closed fluid pressure supply controlling valve structure for connection to a source of fluid pressure, said structure being anchored to the outer face of the cap member and discharging into said inlet, a cap member latching element secured intermediate its ends to the inner face of the cap member and provided with means to form a fluid pressure conducting channel for directing the fluid pressure diametrically of the cap member and into the latter, said inlet opening into said channel intermediate the ends of the latter, and a vertically movable automatically shiftable combined relief and closure element slidably connected to the cap member.

7. In a combined closure cap and fluid pressure applying attachment for fuel tanks of automotive vehicles, a cap member formed with an opening providing an inlet for fluid pressure to the interior thereof, a normally closed fluid pressure supply controlling valve structure for connection to a source of fluid pressure, said structure being anchored to the outer face of the cap member and discharging into said inlet, and a cap member latching element secured intermediate its ends to the inner face of the cap member and provided with means to form a fluid pressure conducting channel for directing the fluid pressure diametrically of the cap member and into the latter, said inlet opposing and opening into said channel, and an automatically shiftable combined relief and closure element slidably connected to and depending with said cap member.

8. In a combined closure cap and fluid pressure applying attachment for fuel tanks of automotive vehicles, a cap member formed with an opening providing an inlet for fluid pressure to the interior thereof, a normally closed fluid pressure supply controlling valve structure for connection to a source of fluid pressure, said structure being anchored to the outer face of the cap member and discharging into said inlet, and a cap member latching element having the upper face of an intermediate stretch thereof secured directly against the inner face of the cap member said stretch being provided in its upper face with a transversely disposed groove open at each end and forming a fluid pressure conducting channel opening at the sides of said stretch, said channel extendng diametrically with respect to said cap member, and said inlet having its inner end discharging into said channel adjacent the ends of the latter, and an automatically shiftable combined relief and closure element slidably connected to and depending from said cap member.

ANTHONY A. VARESE.